United States Patent [19]

Poláček

[11] 3,975,907
[45] Aug. 24, 1976

[54] HYDROSTATIC SERVOMECHANISM WITH ARTIFICIAL FEEDBACK

[75] Inventor: Bohumil Poláček, Brno, Czechoslovakia

[73] Assignee: Zavody tazkeho strojarstva, narodni podnik, Martin, Czechoslovakia

[22] Filed: Oct. 15, 1974

[21] Appl. No.: 514,596

[30] Foreign Application Priority Data
Oct. 16, 1973 Czechoslovakia .................. 7093-73

[52] U.S. Cl. .................................. 60/386; 60/402; 60/405; 60/468; 91/391 R
[51] Int. Cl.² .......................................... F15B 15/18
[58] Field of Search ............ 60/385, 386, 387, 402, 60/405, 468; 91/391 R, 460, 461

[56] References Cited
UNITED STATES PATENTS

| | | | |
|---|---|---|---|
| 2,020,951 | 11/1935 | Lemon | 60/386 |
| 2,058,894 | 10/1936 | Link | 60/468 |
| 2,893,356 | 7/1959 | Murray | 91/391 R |
| 3,135,170 | 6/1964 | Glaser | 60/385 X |

*Primary Examiner*—Edgar W. Geoghegan

[57] ABSTRACT

A hydrostatic servomechanism adapted to control the direction of vehicles and self-propelled machines. The mechanism has a power circuit with at least one servopump, at least one servomotor and at least one distributor, a control circuit with a measuring pump actuated by a command element as for example a steering wheel connected by means of control conduit branches to reset mechanisms and at least one feedback simulator with a flow meter in the power circuit and a controllable throttle means incorporated between the control branches of the control circuit. The feedback simulator forms a combined feedback simulator consisting of the flow meter and the throttle means controllable in steps, the throttle means being formed as a combination of several connected controllable throttle means.

10 Claims, 4 Drawing Figures

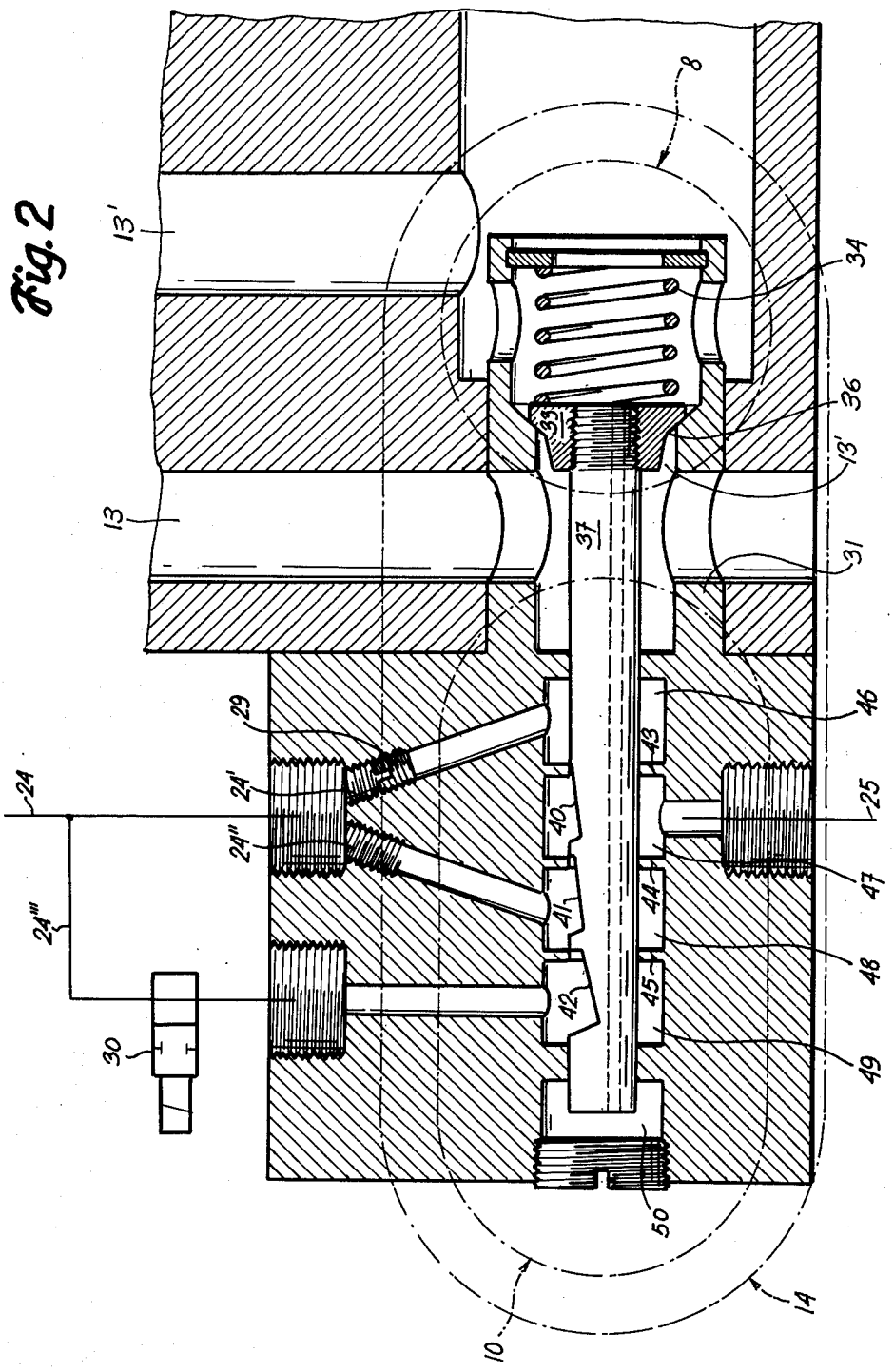

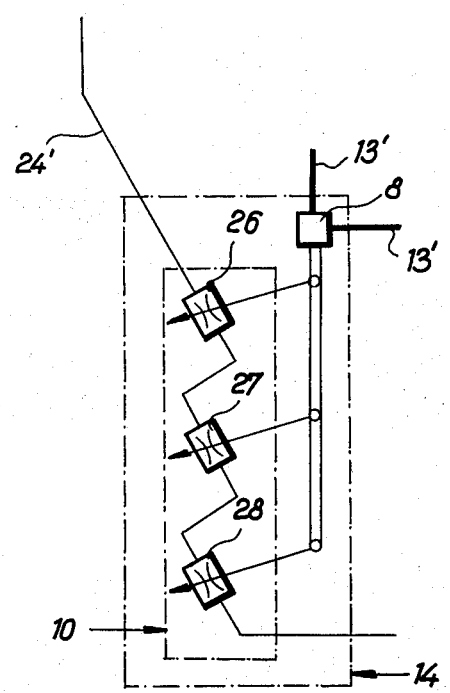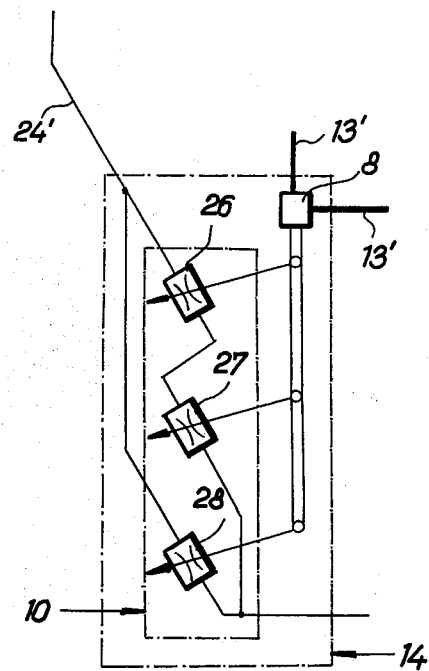

HYDROSTATIC SERVOMECHANISM WITH ARTIFICIAL FEEDBACK

This invention relates to a hydrostatic servomechanism with an artificial feedback, adapted for steering vehicles and self-propelled machines, consisting of a power circuit comprising a servopump, a distributor and a servomotor, a control circuit having a measuring pump connected to reset mechanisms of the distributor through control branches, actuated by a control means, for example a steering wheel, and at least one simulator of the feedback between the input and output part on the servomechanism.

Up to now known hydrostatic servomechanisms use simulators with a simple controlled throttle means, securing only a single step transmission between the input and output parts of the servomechanism. These servomechanisms are not suitable in those cases wherein the transmission ratio of the mechanism is to be altered in the course of the operation of the machine. This is the case in servo drive power steering mechanisms, as for example in shovel loaders, for which a large steering ratio is advantageous during the transport of the loader (large angle of the steering wheel turning) and a small steering ratio for the operation of the loader (small angle of turning of the steering wheel).

The above-mentioned disadvantages of hydrostatic mechanisms with a feedback simulator are eliminated by the hydrostatic servomechanism according to this invention by the fact that, instead of feedback simulators with a simple, controllable throttle means, it uses combined simulators of the feedback with an in-step controllable throttle means consisting of several, mechanically coupled throttle means. By mutual engagement of controllable throttle means in series, parallel or series-parallel, it is possible, in the course of the production and also during the operation of the machine or equipment, to alter the resulting hydrostatic resistance of the throttle means which is controllable in steps and hence simultaneously to control the resulting gear ratio of the servomechanism.

The principle of this invention is that the servomechanism comprises at least one combined simulator of the feedback consisting of a flow meter and a throttle means controllable in steps, formed as a combination of several connected controllable throttle means.

The invention is schematically illustrated in the accompanying drawing, wherein:

FIG. 2 illustrates an example of the construction of a combined simulator of the servomechanism feedback;

FIG. 3 illustrates an example of interconnection of the plurality of individually controllable throttle means in series; and FIG. 4 illustrates an example of interconnection of the plurality of individually controllable throttle means in series-parallel.

Figure 1:
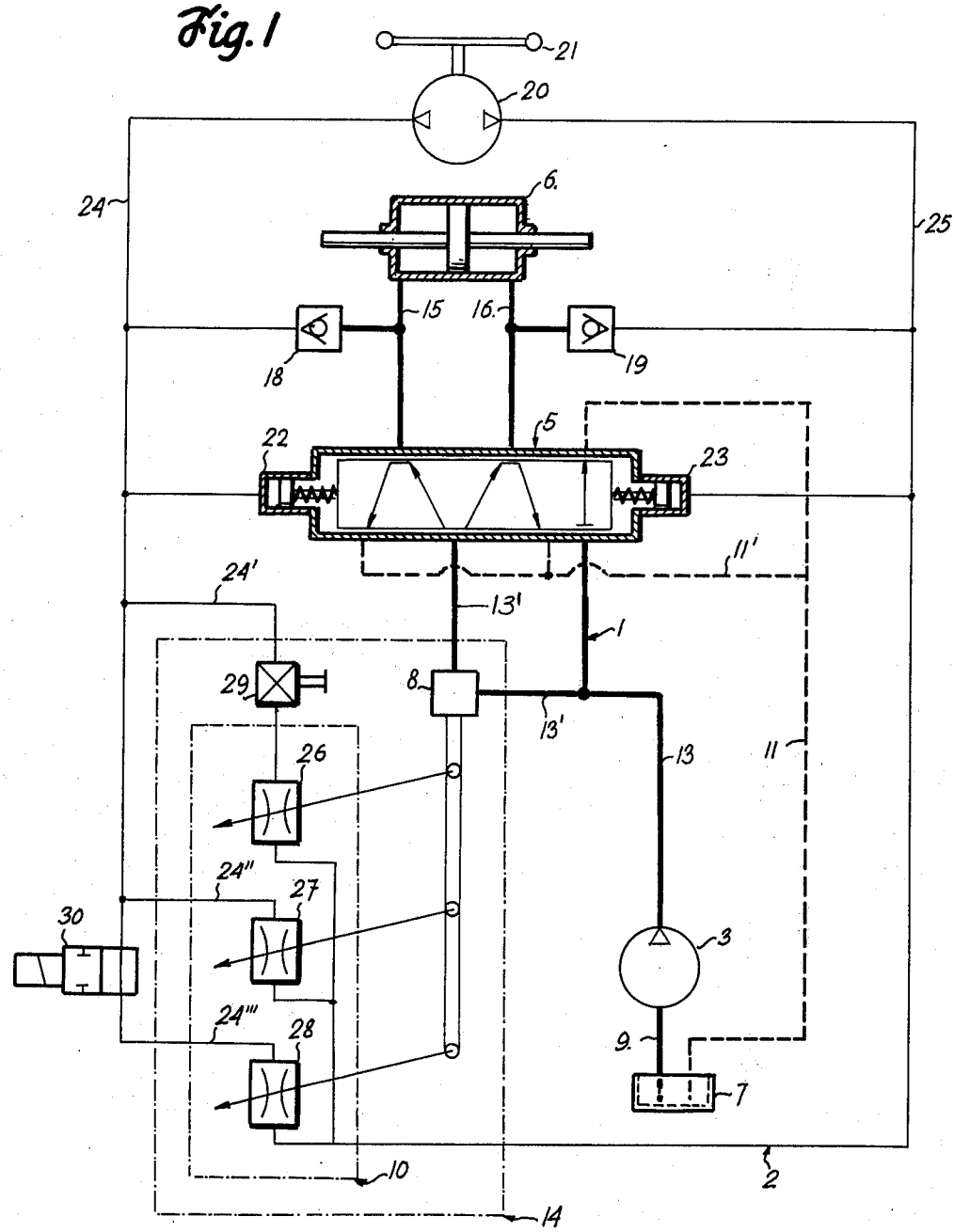
FIG. 1 is a block diagram of a hydrostatic servomechanism with a single pump and a single combined simulator of the feedback.

The hydrostatic servomechanism according to this invention shown in FIG. 1 has a power circuit 1 indicated in heavy lines and a control circuit 2 indicated in light lines. The power circuit 1 is formed by a driven servopump 3, a distributor 5, a servomotor 6, a tank 7 and a flow meter 8. The servopump 3 is connected by a suction branch conduit 9 to the tank 7 and by the discharge branch 13 to the branching pipe 13' leading to the distributor 5. The distributor 5 is connected through the consumption branches 15, 16 with the servomotor 6 and by the discharge branch 11 and through its branching pipe 11' with the tank 7. The flow meter 8 is incorporated in the branching pipe 13' of the discharge branch 13, to measure the whole liquid coming from the servopump 3 via the distributor 5 to the servocylinder 6.

The control circuit 2 is formed by the measuring pump 20 actuated by the command element 21, as for example a steering wheel, and connected by control branches 24, 25 to reset mechanisms 22, 23 of the distributor 5. Between both control branches 24, 25 there is connected the throttle means 10 controllable in steps. The throttle means 10 consists of three controllable throttle means 26, 27, 28 connected in parallel and positioned, respectively, in branch pipes 24', 24'', 24'''. The controllable throttle means 27 is connected permanently between branches 24, 25, the controllable throttle means 26 is connected when permitted by a closing valve 29, and the controllable throttle means 28 is connected between branches 24, 25 when a two-position distributor 30 operated by an electromagnetic control is open. By the closing valve 29 it is possible during a production or a test run to set up, and by means of the two-position distributor 30 during the machine operation to alter the resulting hydraulic resistance of the throttle means 10 in steps, and thus to control the transmission ratio to which the gear between the input and the output part of the servomechanism conforms.

The number of partially controllable throttle means 26, 27 and 28 and their interconnection and the number, the performance and connection of the closing valves 29 and the two-position distributors 30 can be different from the disclosed embodiment. Thus, for example, the controllable throttle means 26, 27, 28 need not be interconnected in parallel but can be connected in series or series-parallel.

The flow meter 8 can be represented by any hydraulic element responding to flow variation by the change of the position or the shape of any of its elements, for example, a non-return valve with a spring, a diaphragm and the like. The flow meter 8 is mechanically connected to the step controlling throttle means 10, forming with it the combined feedback simulator 14.

The servomotor 6 in the sense of this invention can be any hydraulic cylinder or hydro-motor or a group consisting of these elements. The servomotor 6 is further connected to working mechanism (not shown) or a device as for example the steering mechanism turning the wheels of a vehicle or machine.

The filling of the control circuit 2 with liquid is not shown in the block diagram of the servomechanism as this can be accomplished in a standard way. So for example the control circuit 2 can be replenished with the liquid from the waste branch 11, from the discharge branch 13, or a special, motor-driven pump can be used for filling.

Other types of the distributor 5 other than that shown schematically in FIG. 1 can be used in the servomechanism according to this invention. The distributor 5 can for example be modified to be supplied by several pumps.

In the case of feeding the distributor 5 from several pumps, one combined feedback simulator 14 can be used for each servopump, or one common combined feedback simulator 14 can be used for all servopumps. In the first case, there is in the discharge branch 13 of each servopump 3 one flow meter 8; in the latter case there is in the common discharge branch 13 of all pumps 3 or in the branching pipe 11' of the waste branch 11 a single common flow meter 8.

FIG. 2 shows an example of an embodiment of a combined feedback simulator 14 consisting of a flow meter 8, a throttle means 10 controllable in steps, and a closing valve 29. (A screw plug has been drawn in as a closing valve 29 in FIG. 2). The flow meter 8 consists of a non-return valve 33 having a conical end 36 pushed against the seat in an insertion 31 by the coil compression spring 34. To the non-return valve 33 there is connected a shank 37 having chamferings 40, 41, 42 passing through the openings in partitions 43, 44, and 45. In this way controllable throttle means 26, 27, and 28 are formed from the structure of FIG. 1. In the insertion 31 there are cylindrical cavities 46, 47, 48, 49 and 50.

The cylindrical cavity 47 is connected to the control branch 25, while the cylindrical cavities 46, 48, 49 are connected to the control branch 24 through the branch pipings 24', 24'', 24'''. The interconnection of the cavity 46 to the control branch 24 can be eliminated by the closing valve 29. In this way the controllable throttle means 26 which is formed by the chamfering 40 and the partition 43 in FIG. 2 is eliminated from the operation (FIG. 1), formed by the chamfering 40 and the partition 43 in FIG. 2. The interconnection of the cylindrical cavity 49 to the control branch 24 is via the two-position distributor 30. In this way it is possible to engage or disengage the controllable throttle means 28 even during the machine operation (FIG. 1), throttle means 28 being formed by the chamfering 42 and the partition 45 in FIG. 2. The thickness of partitions 43, 44, 45 is small so that the hydraulic resistance of the controllable throttle means 26, 27, 28 (FIG. 1) is approximately the same for all liquid streams and independent of the viscosity of the liquid.

The combined feedback simulator 14 can also be made separately and connected to the relevant parts of the servomechanism by means of pipings or can be built-in directly into the distributor 5. According to FIG. 2, the building-in of the combined feedback simulator 14 into the distributor 5 is assumed.

The combined feedback simulator 14 can be made in various forms. For example, it can comprise any number of controllable throttle means; their interconnection need not be parallel, as shown in FIGS. 1 and 2, but can also be in series or series-parallel. This permits the achievement of a large number of combinations of the resulting hydraulic resistance of the throttle means 10 controllable in steps with even a relatively low number of controllable throttle means. In this way it is possible to alter or engage the transmission during production of even during the operation of the machine or a device, between the input and output parts of the servomechanism. The two-position distributor 30 can be located or controlled so as to enable the engagement of two or more transmission steps of the servomechanism from the place of use of the machine or device.

The servomechanism according to this invention operates as follows:

When the measuring pump 20 (FIG. 1) controlled by the command element 21, for example a steering wheel, is at a standstill, the distributor 5 occupies its center position, at which it interconnects the discharge branch 13 of the servopump 3 to the waste branch 11 and at the same time closes the consumption branches 15, 16 of the servomotor 6. At the center position of the distributor 5 the relieved servopump 3 operates and the position of the servomotor 6 and the working element linked up to it (not shown), such as steered wheels, is arrested.

When rotating the command element 21 operating the measuring pump 20 in one direction of rotation, the measuring pump 20 sucks the liquid from the control branch 25 and discharges it through the control branch 24 to the reset mechanism 22 of the distributor 5 and resets the movable element of distributor 5 to the right in FIG. 1 in proportion to the supplied volume of the liquid, hence interconnecting the consumption branch 15 to the discharge branch 13 and connecting the consumption branch 16 with the waste branch 11. The connection of the discharge branch 13 with the waste branch 11 is throttled at this time. (In the extreme position of distributor 5 it is possible that the throttling changes to the closing of the connection between the waste branch 11 and the discharge branch 13). Due to this a portion or the whole liquid supplied by the servopump 3 flows from the discharge branch 13 through the branching pipe 13' via the flow meter 8 into the distributor 5 and from here flows through the consumption branch 15 into the left-hand side chamber of the servomotor 6. Proportionally to the liquid flow, the flow meter 8 is reset (by fluid pressure driving the non-return valve 33 to the right in FIG. 2) and opens the controllable throttle means 26, 27, 28. In this way the interconnection of the control branches 24, 25 is effected and the liquid is transferred by the measuring pump 20 from the discharge control branch 24 into the suction, control branch 25.

If the rotating of the command element 21 with the measuring pump 20 is stopped, the pressures are equalized between the control branches 24, 25 and the distributor 5 returns back to the center position, due to the centering coil compression springs in the reset mechanisms 22, 23, and the motion of the servomotor 6 is stopped. When rotating the command element 21 to the left, the distributor 5 is reset in its other direction of rotation, the movable element of the distributor 5 is reset and the servomotor 6 also moves.

The proportions between the motion of the command element 21 as for example that between the steering wheel and the motion of the servomotor 6 are such that the liquid flow fed by the measuring pump 20 from one to the other control branch 24, 25 via the throttle means 10 controllable in steps is controlled in dependence upon the liquid flow passing through the flow meter 8 to the servomotor 6.

An analogous function can be achieved by incorporating a combined feedback simulator 14 into the branching pipe 11' of the waste branch 11. In such a connection liquid flows through the flow meter 8 returning back from the servomotor 6 via the distributor 5 to the tank 7.

When the servopump 3 is inactive, no liquid flows through the flow meter 8 and hence the throttle means 10 controllable in steps is closed. Liquid from the measuring pump 20, controlled by the driver by means of a command element 21, for example the steering wheel, is fed according to the direction of rotation of element 21 either from the control branch 24 via the non-return valve 18 into the consumption branch 15 or from the control branch 25 via the non-return valve 19 into the consumption branch 16. The reverse flow of the liquid from the servo-cylinder 6 via the reset distributor 5 is prevented by the non-return valve 33 of the flow meter 8. The emergency manual operation of the servomechanism according to this invention is secured by the above-indicated method.

It will be apparent from the above that the artificial feedback is represented by a coupling means disposed between the inlet and outlet member of the servomechanism and is formed as a link transmitting by means, for example, of the inlet member, the reaction to the outlet member. In the disclosed embodiments the coupling link of said type providing said artificial feedback is represented by the mentioned feedback simulator consisting of the flow meter and throttle means which is controllable in steps and enables the alteration of the transmission ratio of the servomechanism in the course of the operation.

Furthermore, in heavy machines for which is used a large steering ratio (big angle of the steering wheel turning) during the transport of the machines and a small steering ratio for the operation of the machines (small angle of the steering wheel turning) the utilization of said artificial feedback is very advantageous.

The artificial feedback in the hydrostatic servomechanism is formed by inserting the feedback simulator 14, said simulator consisting of the flow meter and in steps controllable throttle means 10. The flow meter 8 further consists of the non-return valve 33, the conical end 36, the insertion 31 with cylindrical cavities inside, the coil compression spring 34, which urges the conical end 36 to the saddle in the insertion 31 and finally of the shank 37 connected with the non-return valve 33.

The whole feedback simulator together with the distributor 5 provides the proportionality between the fluid passage through the measuring pump 20 and fluid passage through the servomotor 6. The coefficient of proportionality is determined by interconnection of the individual throttle means 26, 27, 28. The two-position distributor 30 can be disposed or controlled in a way that the attendance be in condition to alter two or more transmission ratios of the servomechanism.

The operation of the individual partial throttle means is as follows:
  the throttle means 27 is connected permanently between 24 and 25,
  the throttle means 26 is disconnected by a closing valve 29,
  the throttle means 28 is connected by means of a two-position distributor 30 which controls the sensitivity of the steering wheel turning.

When the controllable throttle means 28 is closed, no medium flows through the two-position distributor 30 and the resulting hydraulic resistance is affected so that even a small alternation on the steering member (a small turning of the steering wheel) brings about a large reaction of the servomechanism outlet, i.e. a large turning of the wheels. When, on the contrary, the controllable throttle means 28 is opened, the reaction at the outlet is produced only upon several turns of the steering wheel. In this way using the two-position distributor it is possible to operate the machine or mechanism from the operator's place so as to enable the alternation of two or more transmission ratio steps of the servomechanism. All the three throttle means 26, 27, 28 can be mutually connected in series (FIG. 3), parallel or series-parallel (FIG. 4).

The servomechanism according to this invention enables the achievement in the course of the production and even during the operation variations of the transmission ratio of the input and output part of the servomechanism in a very simple way. The combined feedback simulator provides a high operational reliability due to its simple design and non-sensitivity to possible impurities in the liquid, and hence can also be used in servo-drive power steering mechanisms.

Although the invention is illustrated and described with reference to a preferred plurality of embodiments thereof, it is to be noted that it is in no way limited to the disclosure of such a preferred number of embodiments, but is capable of numerous modifications within the scope of the appended claims.

What is claimed is:

1. In a hydrostatic servomechanism adapted for steering of vehicles and self-propelled machines, said servomechanism including a power circuit comprising at least one servopump, at least one servomotor, a distributor and connecting piping and a control circuit comprising a measuring pump actuated by a command element, the control circuit having control branches, reset mechanism for the distributor, the servomechanism being connected by the control branches to the reset mechanism of the distributor, the improvement which comprises at least one feedback simulator, the feedback simulator comprising a flow meter, and a controllable throttle means mechanically connected to the flow meter, said throttle means controllable in steps being formed as a combination of several controllable individual throttle means which are mutually connected and the feedback simulator being incorporated between the control branches of the control circuit.

2. A hydrostatic servomechanism according to claim 1, wherein the main throttle means is composed of a plurality of individually controllable throttle means which are interconnected in parallel.

3. A hydrostatic servomechanism according to claim 1, wherein the main throttle means is composed of a plurality of individually controllable throttle means which are interconnected in series.

4. A hydrostatic servomechanism according to claim 1, wherein the main throttle means is composed of a plurality of individually controllable throttle means which are interconnected in series - parallel.

5. A hydrostatic servomechanism according to claim 1, wherein the feedback simulator is formed as a non-return valve with a shank extending by its chamfering into partitions which mutually form controllable throttle means of the main throttle means which is controllable in steps.

6. A hydrostatic servomechanism according to claim 5, wherein one of the individually controllable throttle means is connected to the other by means of opening a normally closed valve.

7. A hydrostatic servomechanism according to claim 6, wherein at least one of the individually controllable throttle means is connected to the other by at least one valve provided with control means.

8. A hydrostatic servomechanism according to claim 1, wherein at least one of the individually controllable throttle means is connected to the other by at least one two-position distributor, said distributor being so constructed and arranged as to alter the resulting hydraulic resistance of the main throttle means during the operation of the machine.

9. A hydrostatic servomechanism according to claim 8, wherein under standstill conditions of the servomechanism the connection of the control branches via the main throttle means is interrupted.

10. A hydrostatic servomechanism according to claim 1, wherein the feedback simulator is interposed in the common discharge branch of the servopump which feeds the distributor of the servomechanism.

* * * * *